INVENTOR.
CORNELIS VAN DER LELY
BY
Mason, Mason & Albright
Attorneys

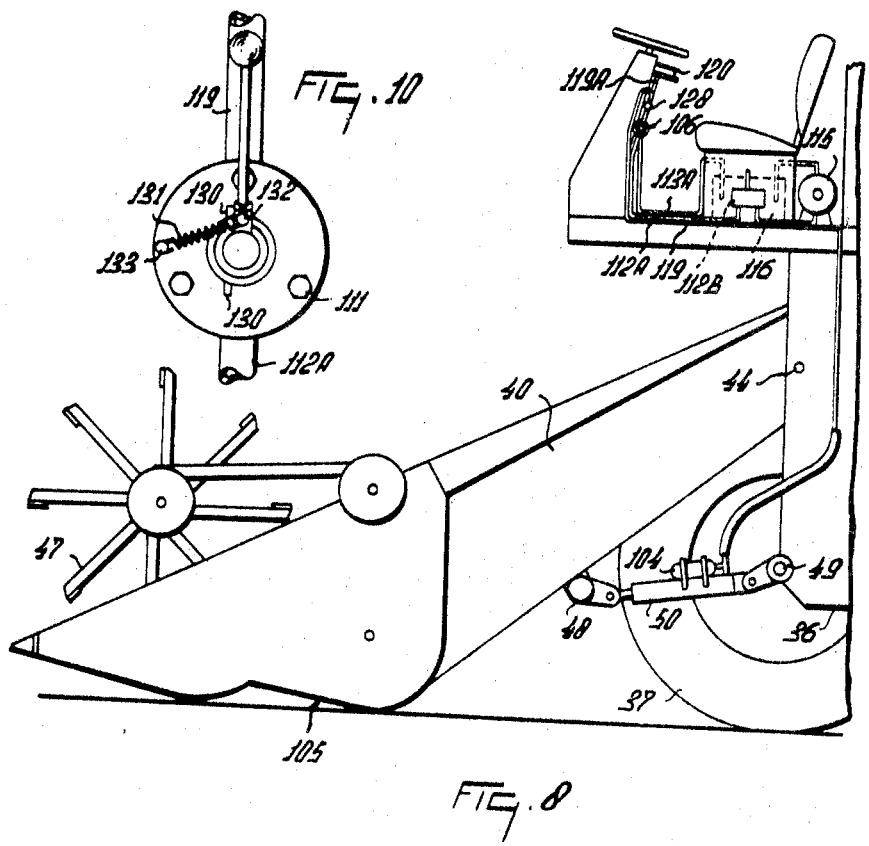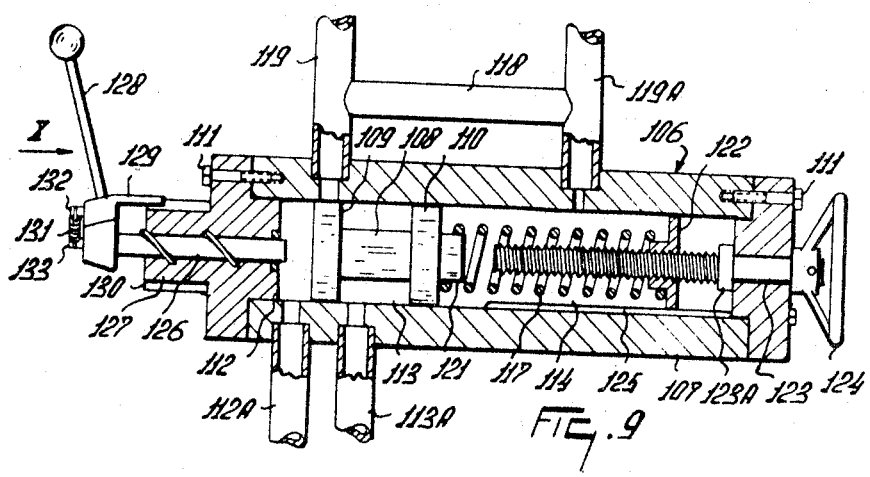

INVENTOR.
CORNELIS VAN DER LELY
BY
Mason, Mason & Albright
Attorneys

United States Patent Office 3,461,655
Patented Aug. 19, 1969

3,461,655
AGRICULTURAL MACHINES
Cornelis van der Lely, Zug, Switzerland, assignor to Texas Industries Inc., Willemstad, Curacao, Netherlands Antilles, a limited-liability company of the Netherlands
Filed July 19, 1965, Ser. No. 472,878
Claims priority, application Netherlands, July 28, 1964, 6408591; Sept. 29, 1964, 6411285
The portion of the term of the patent subsequent to June 3, 1985, has been disclaimed
Int. Cl. A01d 67/00, 75/28
U.S. Cl. 56—208                               11 Claims

ABSTRACT OF THE DISCLOSURE

A harvester having one or more mowing and crop gathering members pivotably connected for being lifted to a combine. Hydraulic rams connecting the harvester and the crop gathering members are adapted to reduce the weight of the gathering members by increasing the hydraulic fluid pressure in the rams. The hydraulic fluid pressure and thus the effective pressure of the gathering member on the ground is maintained at a desired constant level which is controlled by a control member located, together with a gauge connected to the hydraulic ram, near the operator's seat. The operator is therefore informed of and is able to control the effective pressure of the gathering members on the ground.

SUMMARY OF THE INVENTION

This invention relates to agricultural machines, such as combine harvesters or tractors, of the kind comprising or being adapted to carry a working member which is arranged to bear on the ground and follow undulations in the surface thereof during operation of the machine.

In accordance with the invention there is provided a machine of the kind set forth, wherein means is provided for indicating the pressure which the working member exerts on the ground during operation of the machine.

For a better understanding of the invention and to show how the same may be readily carried into effect, reference will now be made, by way of example, to the accompanying drawings, in which:

BRIEF DESCRIPTION OF THE INVENTION

Figure 1:
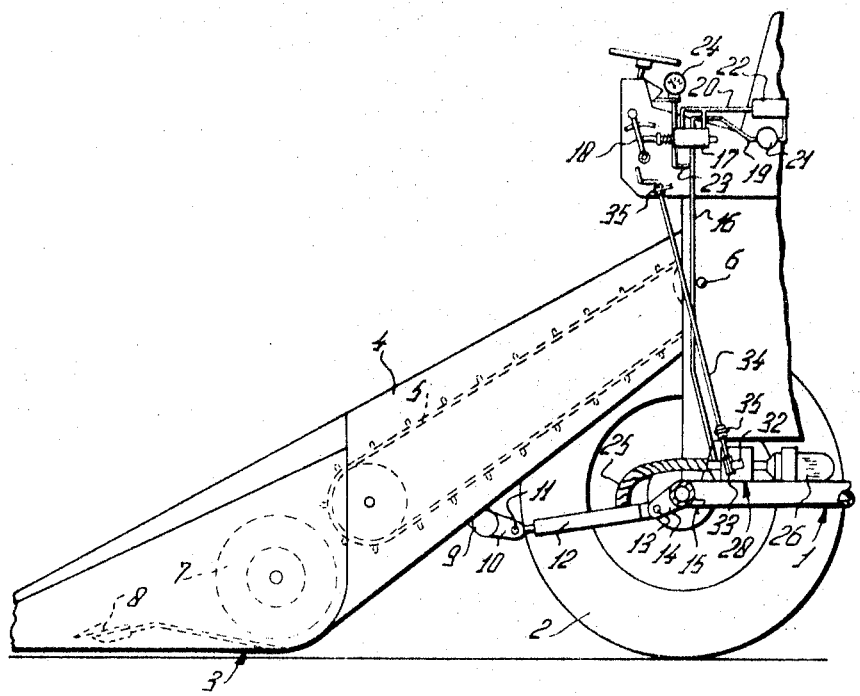
Figure 2:
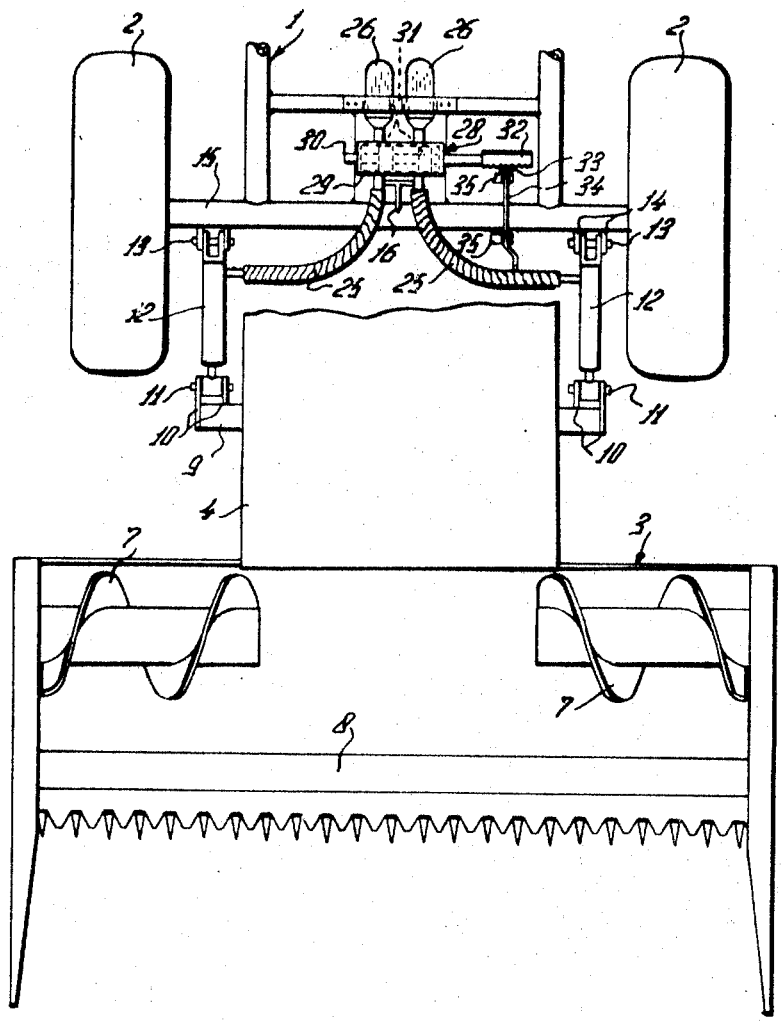
Figure 3:
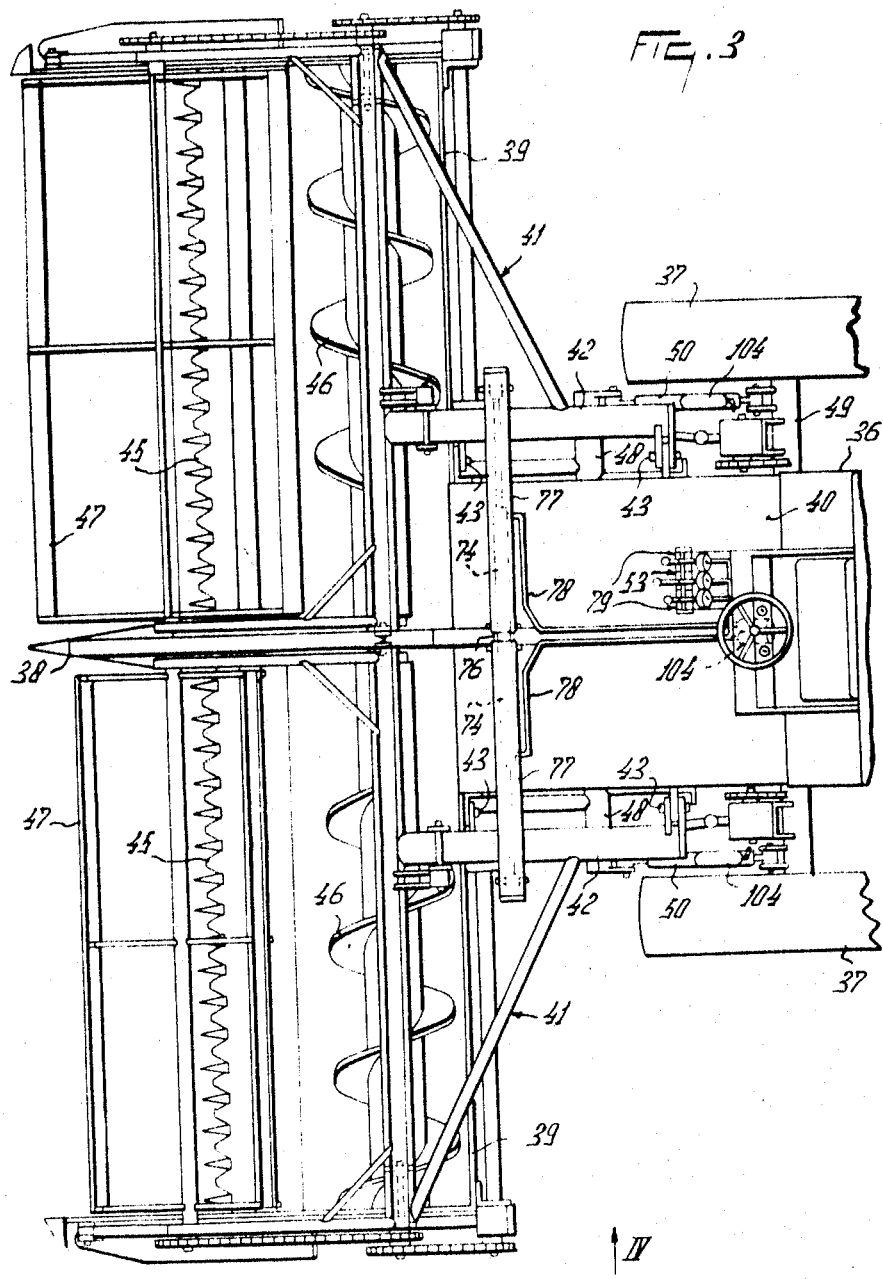
Figure 4:
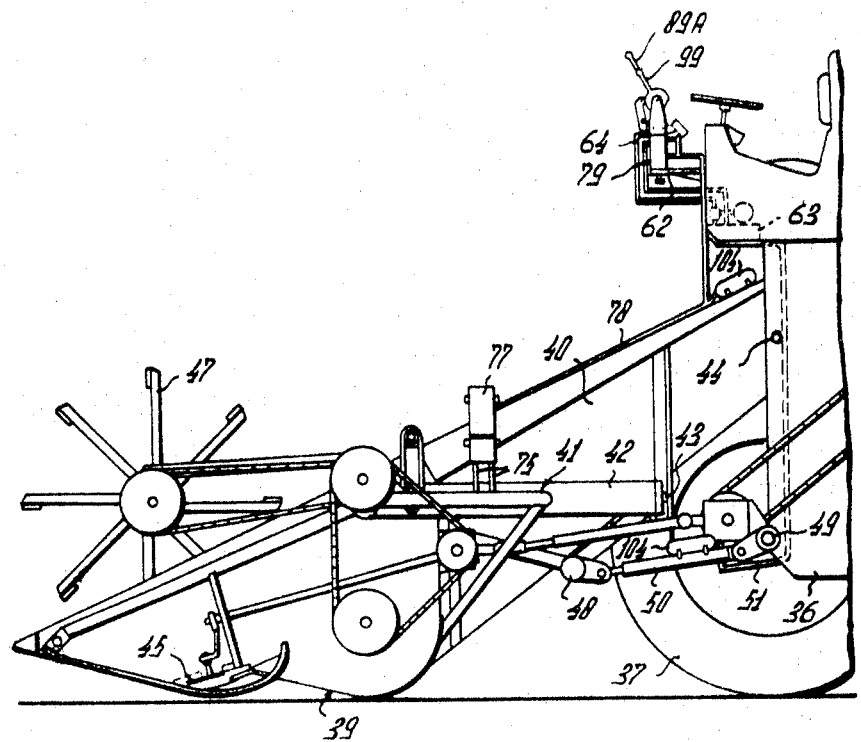
Figure 5:
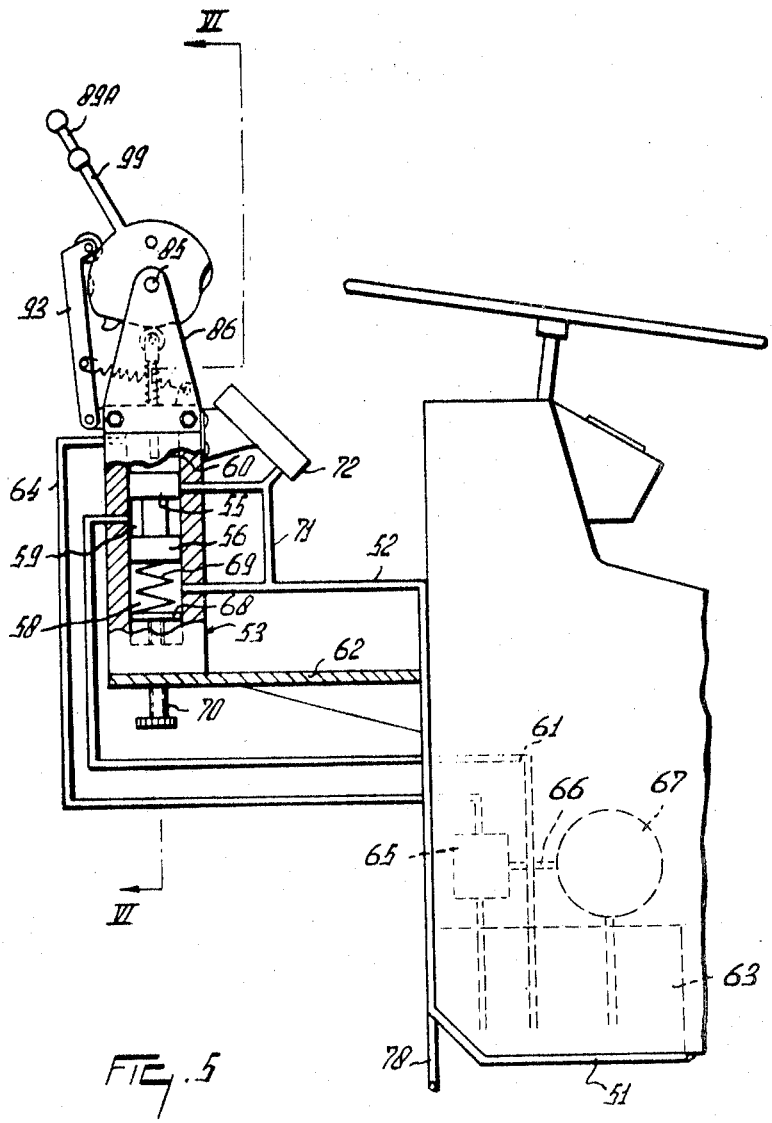
Figure 6:
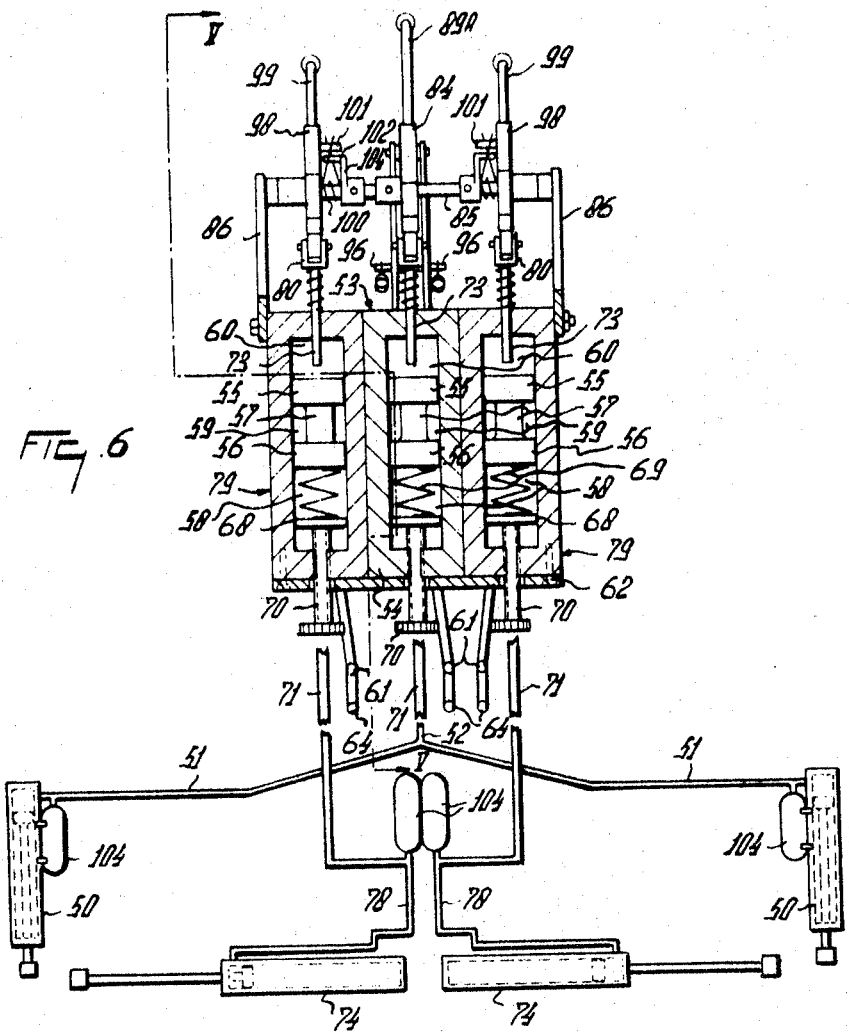
Figure 7:
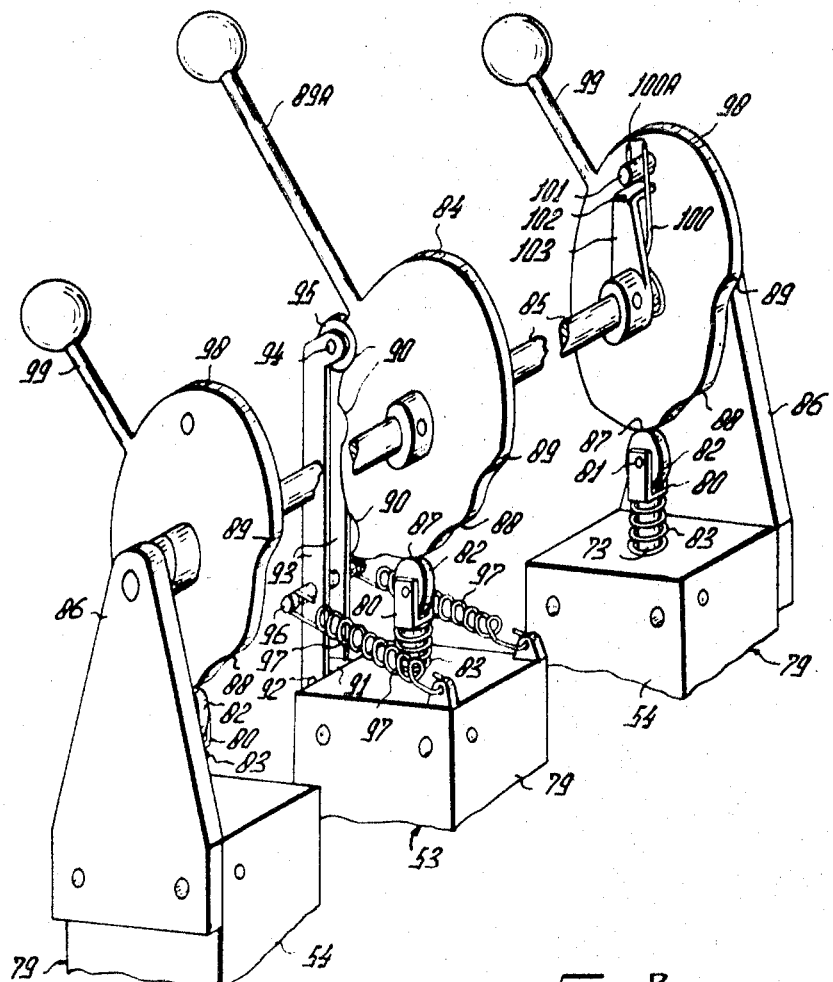
Figure 11:
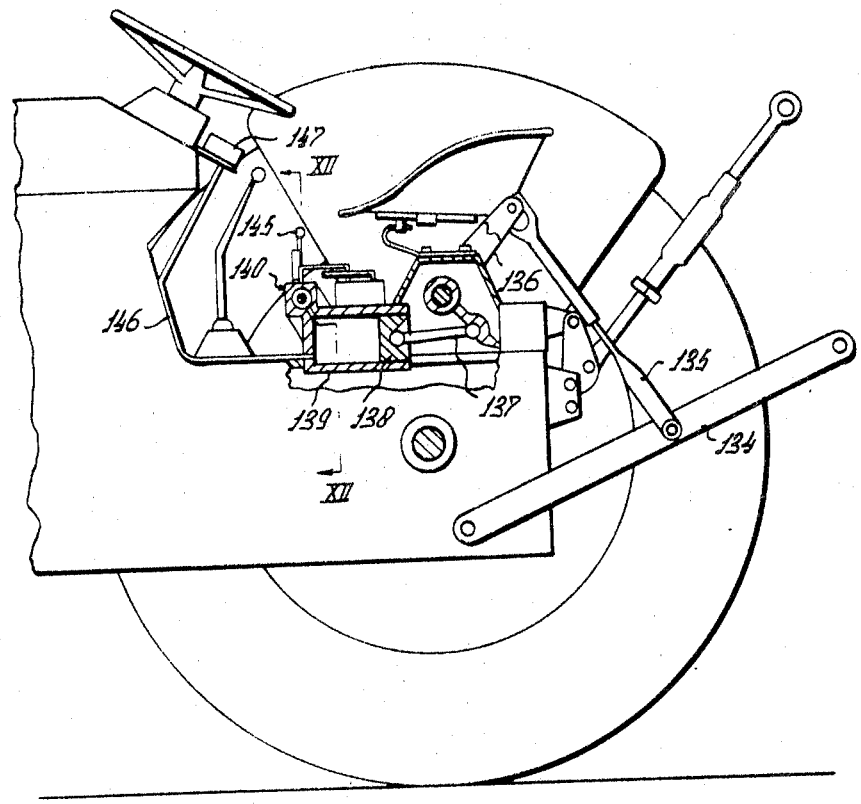
Figure 12:
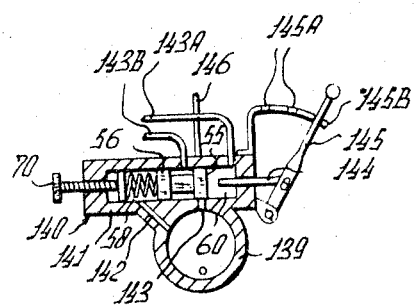

FIGURE 1 is a side view of the foremost part of a machine in the form of a combine harvester in accordance with the invention, FIGURE 2 is a plan view of the part shown in FIGURE 1, FIGURE 3 is a plan view of the foremost part of an alternative embodiment of combine harvester, FIGURE 4 is a side view taken in the direction of the arrow IV in FIGURE 3, FIGURE 5 is a sectional view of control mechanisms taken on the line V—V in FIGURE 6, FIGURE 6 is a view, partly in section, taken on the line VI—VI in FIGURE 5, and partly a diagrammatic view, on a reduced scale, showing the hydraulic circuit and the adjusting members forming part of such circuit, FIGURE 7 is a perspective view, to an enlarged scale, showing the adjusting members for the control mechanisms, the housings of said control mechanisms being spaced relatively far from each other for the sake of clarity, FIGURE 8 is a side view of the foremost part of a further alternative embodiment of combine harvester, FIGURE 9 is a sectional view, to an enlarged scale, showing the control mechanism for the combine harvester of FIGURE 8, FIGURE 10 is a view taken in the direction of the arrow X in FIGURE 9, FIGURE 11 shows part of a further machine in accordance with the invention comprising a tractor, and FIGURE 12 is a sectional view, to an enlarged scale, taken on the line XII—XII in FIGURE 11.

DESCRIPTION OF THE PREFERRED EMBODIMENTS

Referring to FIGURES 1 and 2 of the drawings, the harvesting machine comprises a combine harvester, though only the mowing and elevator mechanisms mounted at the front thereof are shown. The combine harvester comprises a frame 1 supported by ground wheels, though only the ground wheels 2 at the front of the combine harvester are shown. The mowing mechanism comprises a mowing table or platform 3 that is mounted at the forward end of an elevator housing 4 which extends upwardly and rearwardly therefrom and defines a central elevator for crop fed from the mowing mechanism to the housing. The housing 4 accommodates an endless conveyor 5 which is mounted at its upper end on a shaft 6 that extends perpendicular to the intended direction of operative travel of the combine harvester. The shaft 6 also affords a pivotal mounting of the housing 4 and platform 3 which are both together upwardly and downwardly movable about said shaft 6.

The mowing platform 3 comprises two feed augers 7 that extend perpendicular to said direction of travel and are arranged behind the cutting mechanism comprising the cutter bar 8. A supporting beam 9 is arranged on the lower side of the housing 4 and extends perpendicular to said direction of travel. Rearwardly extending pairs of lugs 10 are arranged at each end of the beam 9 and hydraulic lifting cylinders or rams 12 are pivotally connected to the pairs of lugs 10 by means of pins 11. The rams 12 are also pivotally connected to pairs of lugs 14 depending from the axle 15 of the ground wheels 2 by means of pins 13.

The rams 12 communicate with a control valve 17 mounted near the driver's seat through corresponding flexible pipes 25 and a common pipe 16 extending to the valve 17. The pipes 25 are of relatively large diameter compared with the pipe 16. The control valve 17 is operable by means of a control lever 18 and communicates with a pump 21 and tank 22 by way of pipes 19 and 20 respectively. A pressure gauge 24 is coupled with the hydraulic circuit by way of a bleed tube 23 which communicates with the pipe 16 near its connection with the valve 17. The rams 12 also communicate through the pipes 25 with corresponding gas pressure vessels 26 which preferably contain nitrogen.

From the figures it will be evident that the pressure vessels 26 comprise substantially horizontally disposed cylinders that are arranged approximately midway between the rams 12. A control mechanism 28 is arranged between the pipes 25 and the pressure vessels 26, the mechanism 28 comprising a housing 29 that communicates with the pipes 25 and receives a rod 30 reciprocably mounted therein. The rod 30 carries two pistons 31 which move to cover and uncover the openings to the pressure vessels 26 on reciprocation of the rod 30. One end of the rod 30 carries a rack 32 which cooperates with a pinion 33 mounted on the lower end of a crank 34 which extends upwardly therefrom to a position near the driver's seat. The crank 34 is rotatably mounted in bearings 35 provided on the frame of the combine harvester.

From FIGURE 2 it will be seen that the pipe 16 communicates with the pipes 25 by relatively short tappings extending near the control mechanism.

The operation of the combine harvester will now be shown in FIGURE 1 and the control lever 18 is urged into the position shown in FIGURE 1 which is such that there is no communication with the pipe 16 and the pump described. The mowing platform 3 occupies the position 21 or tank 22 through the control valve 17. It will be evident that the load of the platform 3 and housing 4 is taken partly by the hydraulic rams 12 which communicate with the pipes 25. Since the pipe 16, as just mentioned, cannot communicate with the pump 21 or tank 22, hydraulic pressure is transmitted from the pipes 25 to the control mechanism 28. If the control mechanism 28 is so arranged that the pistons 31 at least partly uncover the openings to the pressure vessels 26, then the hydraulic fluid will compress the gas contained in such vessels 26 until equilibrium is reached. Thus the rams 12 comprise resilient supporting members for the table 3 and housing 4 when communication with the pressure vessels 26 is allowed.

If the mowing table 3 moves downwardly about the shaft 6 when, for example, a hollow or downward depression in the ground is encountered the pistons in the rams 12 urge liquid towards the reservoirs 26 thereby compressing the gas contained therein. After the hollow has been passed, the mowing table 3 will move upwardly about the shaft 6 and the pistons will move in an opposite direction and the gas in the pressure vessels 26 will regain its initial volume.

The pressure gauge 24 measures the pressure in the hydraulic circuit which can be varied on operation of the control mechanism 28. If the pressure in the circuit is too high, as indicated by the pressure gauge 24, then the mowing table 3 bears on the ground with too small a pressure but, on the other hand, if the pressure is too low then the mowing table 3 bears on the ground with too great a pressure. The pressure with which the mowing table bears on the ground desirably should vary accordingly to ground conditions. With a weak soil it is desirable that the mowing table bear on the ground with a relatively low pressure and hence the pressure in the hydraulic circuit must be relatively high. The driver of the combine harvester can readily ascertain the pressure in the circuit by means of the pressure gauge.

The degree of communication of the hydraulic liquid with the gas pressure vessels 26 can be varied by means of the control mechanism 28. Referring to FIGURE 2, it will be evident that movement of the rod 30 to the left can reduce or block the passage to the vessels 26. This will obviously cause the support of the rams 12 to be less resilient. When the combined harvester is travelling at a relatively high speed, a mowing table tends to oscillate violently when encountering obstacles owing to its inertia. In such a case it is desirable that a more rigid support by the rams 12 be obtained which is effected by blocking the passage to the vessels 26.

When, on the other hand, the combine harvester is mowing relatively slowly, the communication of the hydraulic fluid with the pressure vessels 26 may be increased and hence the rams 12 support the housing 4 and platform 3 more resiliently so that the platform 3 follows the surface of the ground smoothly.

The construction in accordance with the invention just described may be employed in other harvesting machines which are provided with cutting and/or pickup mechanisms. It is particularly suitable for harvesting machines which comprise cutting and/or pickup mechanisms which bear on the ground during operation and whose weight is relatively heavy. The construction described provides in a simple manner a harvesting machine having a cutting and/or pickup mechanism which can follow the ground surface and bear upon same with any chosen pressure according as to the ground conditions and the pressure gauge assists in determining the chosen pressure.

Referring to the second embodiment shown in FIGURES 3 to 7 and more particularly to FIGURES 3 and 4, there is shown the forward part of a combine harvester which includes a frame 36 supported by front ground wheels 37. The cutting mechanism comprises a mowing table or platform 38 which has two adjacent portions 39. The portions 39 are mounted at the forward end of an elevator housing 40 which is upwardly and downwardly movable about a shaft 44 that extends perpendicular to the intended direction of operative travel of the combine harvester. Each portion 39 has a corresponding supporting frame 41 which comprises a beam 42 extending in said direction of travel and along one side of the elevator housing 40. Each beam 42 is pivotable with respect to the housing 40 on two aligned pivot pins 43 that are secured to said one side of the housing 40. The housing 40 accommodates an endless conveyor which is rotatable about the shaft 44 which also comprises the pivotal axis of the housing 40 and portions 39.

Each portion 39 has a cutter bar 45 and a feed auger 46 located behind said cutter bar 45. Also a reel 47 is arranged above the cutter bar 45. In order to adjust the mowing table 38 and housing 40 about the axis afforded by the shaft 44, an adjusting cylinder or hydraulic ram 50 is provided for each portion 39. The rams 50 are pivotally connected to a supporting beam 48 that is arranged beneath the housing 40 and supports same. The beam 48 extends perpendicular to the intended direction of travel and the other ends of the rams 50 are pivotally connected to the axle 49 of the ground wheels 37.

The adjusting cylinders or rams 50 form part of a hydraulic circuit for adjusting the height of the mowing table, said circuit being shown diagrammatically in FIGURES 5 and 6. FIGURE 6 shows three adjacent control mechanisms 53 and 79, the mechanism 53 being located between the mechanisms 79. From FIGURES 5 and 6 it will be seen that each ram 50 communicates by way of a pipe 51 with a common pipe 52 which communicates with the housing 54 of the control mechanism 53. The housing 54 accommodates a pair of spaced pistons 55 and 56 which are slidable in directions parallel to the longitudinal axis of the housing and are interconnected by a connecting member 57. The pair of pistons 55 and 56 divides the bore in which they are slidable into three compartments 58, 59 and 60. The compartment 58 communicates with the pipe 52 (FIGURE 5) from the rams 50 and the compartment 59 communicates through a pipe 61 with a tank 63 of the hydraulic circuit. The compartment 60 communicates with a pump 67 of the hydraulic circuit through a pipe 64, a return valve 65 and a pipe 66. A spring 69 is provided in the compartment 58 and extends between the piston 56 and a stop 68 bearing on the upper end of a set bolt 70 screwed through a hole formed in a wall of the housing 54. The mechanisms 79 are similarly constructed to the mechanism 53 and like parts are designated by the same reference numerals.

From FIGURE 5 it will be seen that the common pipe 52 from the rams 50 communicates with a tapping 71 which communicates with a pressure gauge 72 provided for measuring the pressure in the rams 50. The wall of the housing 54 opposite to the one provided with the set bolts 70 receives rods 73 which extend into the compartments 60 of the mechanisms 53 and 79. The rods 73 form part of adjusting members for the pistons 55 and 56 which will be described later.

In order to raise and lower the portions 39 of the mowing table 38 by turning same about the pivotal axes afforded by the pins 43, adjusting cylinders or rams 74 are provided which also form part of said hydraulic circuit. As seen in FIGURES 3 and 4, the rams 74 are arranged between arms 75 extending upwardly from the beams 42 and supports 76 provided on the upper side of the housing 40. The rams 74 are arranged co-axial with each other between depending limbs of channel beams 77.

As seen in FIGURE 6, each ram 74 communicates through a pipe 78 with a corresponding control mechanism 79. From FIGURES 3 and 6 it will be evident that the housings 54 of the control mechanisms 53 and 79 are joined to form a single unit which is arranged on a plate 62 mounted near the driver's seat. The housings 54 are so arranged that their longer sides extend substantially vertically and the set bolts 70 that cooperate with the springs 69 are located on the lower side of the unit. The rods 73 carry forks 80 at their upper ends and rollers 82 are rotatably mounted between the limbs of said forks 80 by means of pivot pins 81. The rods 73 are surrounded by compression springs 83 which extend between the forks 83 and the upper sides of said unit.

The roller 82 associated with the control mechanism 53 is urged by its spring 83 against the periphery of a cam disc 84 that is secured to a shaft 85 rotatably mounted in a support 86 (FIGURE 7). The shaft 85 is located above the control mechanisms 53 and 79 and the supports 86 are secured to the housings of the control mechanism by means of bolts which simultaneously draw the housings 54 towards each other and into contact with each other as seen in FIGURE 6.

From FIGURE 7 it will be seen that the periphery of the disc 84 is so shaped that it has a cam that has three steps or curved projections 87, 88 and 89. It will be evident that the rod 73 of the mechanism 53 will occupy three different positions relative to the housing 54 when the roller 82 comes into contact with any one of said steps 87, 88 or to 89. The disc 84 carries a lever 89A and the periphery of the disc 84 is formed with three recesses 90. The recesses 90 are adapted to receive a roller 95 rotatably mounted between two arms 93 on a pin 94. The arms 93 are pivotally connected to the housing 54 of the control mechanism 53 by means of a support 91 secured to the housing 54 and a pin 92. When the roller 95 is received in any chosen one of the recesses 90, a corresponding one of the steps 87, 88 or 89 is then in engagement with the roller 82 of the rod 73. The roller 95 is urged into engagement with the disc 84 by means of tension springs 97 which extend between the housing 54 of the control mechanism 53 and a support 96 connected to the arms 93.

The rollers 82 of the adjusting members for the pistons 55 and 56 of the adjusting mechanisms 79 co-operate with cam discs 98 which are also provided with three steps 87, 88 and 89. Each disc 98 carries a lever 99 which is located on the same side as the lever 89A of the disc 84. The discs 98 are rotatable about the shaft 85 and are coupled therewith by means of springs 100 that are attached to the shaft 85 and have their ends 100A, which cooperate with stops 101, mounted near the circumferences of the discs 98. The ends 100A are located one on each side of the corresponding stop 101. There are also arranged between said ends 100A the bent-over ends 102 of strips 103 provided on the shaft 85.

From FIGURES 3 to 6 it will be evident that each of the hydraulic rams 50 communicate with a gas pressure vessel 104 in addition to the pipes 51. The vessels 104 are fastened to the rams 50 (see FIGURE 4) and the hydraulic rams 74 are also associated with pressure vessels 104 which preferably contain nitrogen.

The hydraulic system includes means for maintaining a constant pressure in the hydraulic rams that cooperate with the working members of the machine which are, in this particular embodiment, the mowing table or parts thereof. The operation of the hydraulic system will now be described.

The working member comprising the moving table is supported by the hydraulic rams 50 and is moved over the ground with its base bearing against the ground surface. In this position of the mowing table shown in FIGURE 4, the pistons 55 and 56 in the housing 54 of the control mechanism 53 occupy the position shown in FIGURE 5. As mentioned previously, the rams 50 communicate with the compartment 58 and, for the position of the pistons 55 and 56 shown in FIGURE 5, communication is blocked between the rams 50 and the pump 67 and tank 63 by way of the compartments 60 and 59, respectively. The piston 55 shuts the opening to the tapping 71 and the pistons 55 and 56 are held in position shown in FIGURE 5 by virtue of the fact that the pressure in the rams 50 together with the force exerted by the spring 69 balances the pressure in the compartment 60 produced by the pump 67. When the pressure in a ram 50 varies, for example, when a portion of the mowing table encounters an obstacle, the pressure in the compartment 58 will also vary so that the pistons 55 and 56 are displaced and the opening to the tapping 71 is uncovered by the piston 55 so that liquid can flow to or from the ram 50 concerned from or to the pump 67 or tank 63, respectively.

Upward movement of the mowing table will cause the pressure in the rams 50 to decrease which hence decreases the pressure in the compartment 58 and the pistons 55 and 56 are both displaced so that the tapping 71 can communicate with the compartment 60 so that liquid can flow to the rams 50 from the pump 67 until equilibrium is reached whereupon the piston 55 again blocks the opening to the tapping 71 and the mowing table bears on the ground with the same pressure. When the mowing table encounters a hollow or depression in the ground, the liquid in the rams 50 will be compressed to a greater extent and the pressure in the compartment 58 will increase so that the pistons 55 and 56 are moved so as to communicate the tapping 71 with the compartment 59 so that liquid can flow from the rams 50 to the tank 63. The pressures in the rams 50 will then be reduced to their original values and the mowing table can bear on the ground with its initial pressure.

The gas pressure vessels 104 associated with the rams 50 assists in a smooth following of the surface of the ground by the mowing table owing to the compressibility of the gas contained in such vessels 104. The vessels 104 ensure a smooth following of the ground surface in response to relative small unevennesses in the ground surface. The pressure which the mowing table normally exerts on the ground can be varied by means of the set bolt 70 associated with the control mechanism 53. Turning of such set bolt 70 alters the compression in the spring 69. It will be evident that, if the compression in the spring 69 is increased, then a relatively lower hydraulic pressure in the compartment 58 and rams 50 will be required in order to balance the forces exerted by the pressure of the hydraulic liquid in the compartment 60 that is in communication with the pump 67. With a lower hydraulic pressure in the rams 50, the mowing table will bear on the ground with a greater pressure and, conversely, reducing the compression in the springs 69 will cause the moving table to bear on the ground with relatively lower pressure. The pressure prevailing in the rams 50 may be ascertained by viewing the pressure gauge 72.

The set bolt 70 associated with the control mechanism 53 used in conjunction with the pressure gauge 72 provides a means whereby the pressure in the rams 50 and hence the pressure which the moving table exerts on the ground, can be set to any desired value prior to commencing operation of the combine harvester. Once chosen, this pressure will be automatically maintained. The operation of the control mechanisms 79 for the hydraulic rams 74 corresponds with the operation of the control mechanism 53 just described. The control mechanism 79 for the rams 74 enable a satisfactory adaptation of the outside edges of the mowing table portions 39 to the ground surface. The portions 39 which each comprise a working member are pivotable relative to the frame of the combine harvester about pivotal axes afforded by the pins 43. Also the vessels 104 associated with the portions 39 afford a resiliency to the support thereof by the rams 74.

As stated previously, the rods 73 which are slidably arranged in the housings 54 of the control mechanisms 53 and 79 can be moved into three different positions by means of the cam disc 84 for the control mechanism 53 and the cam discs 98 for the control mechanisms 79. In the positions of the discs shown in FIGURE 7, the rods 73 occupy the positions shown in FIGURE 6 and the rollers 82 bear against the steps 87 on the peripheries of the discs. The disc 84 may be rotated by means of the lever 89A and the discs 98 then will also be rotated by the same amount until the rollers 82 come into contact with the steps 88. The rods 73 then abut against the pistons 55 to prevent the compartments 59 from communicating with the rams 50 and 74, respectively, as would normally be the case when said pistons are moved by variations in pressure in the rams. This position of the rod 73 can be varied when in operation the mowing table is held at a distance above the ground. Out of this position in which the rollers 82 bear against the steps 88, the resilient connection of the discs 98 with the shaft 85 permits them to be moved independently of each other and the disc 84, by means of the levers 99 into positions in which their rollers 82 come into contact with the steps 89.

As a result of the movement of the discs 98 so that the rollers 82 come into contact with the steps 89, the rods 73 in the housings 54 of the control mechanisms 79 are displaced so that the pistons 55 no longer prevent a supply of liquid from the pump 67 to the rams 74. Hence the portions 39 of the mowing table can be pivoted upwardly about their pivots 43. Hence, during operation, each portion 39 can be independently pivoted, if desired, about its pivotal axis afforded by the pins 43. The rigidity of the springs 100 is such that, when a disc 98 is displaced, the disc 84 is not unlocked from the engagement of the roller 95 with the chosen recess 90. The mowing table as a whole can be raised by mowing the lever 89A until the disc 84 takes up such a position that the roller 82 comes into contact with the step 89. The disc 84 is held in this position by the roller 95 and the pistons 55 and 56 are then located in a position such that liquid can flow from the pump 67 to the rams 50.

It will be evident from FIGURE 7 that the step 89 on the disc 84 is offset relative to the steps 89 on the discs 98 so that said first-mentioned step 89 comes into contact with the roller 82 of the control mechanism 53 for the rams 50 earlier than the steps 89 of the discs 98 come into contact with the rollers 82 of the control mechanisms 79. Hence the mowing table will be raised partly before the steps 89 on the discs 98 come into contact with the rollers 82 of the control mechanisms 79 thereby pivoting the portions on the mowing table inwardly about the pivots 43 by the rams 74.

Referring now to FIGURES 8 to 10, there is shown a further alternative embodiment of combine harvester which has a mowing table 105 that comprises a single working member. In this embodiment the rams 50 and pressure vessels 104 associated therewith are arranged in the same manner as for the embodiment of FIGURES 3 to 7. The hydraulic circuit including the hydraulic rams is provided with a control mechanism 106 which operates in similar manner to the control mechanisms 53 and 79 described with reference to the preceding embodiment. However, the construction of the control mechanism 106 differs from that of said mechanisms 53 and 79 and will be described more fully with reference to FIGURE 9.

As in the previous control mechanisms, the control mechanism 106 has an elongated housing 107 which accommodates two pistons 109 and 110 which are interconnected by a connecting member 108 and said pistons are movable in directions parallel to the longitudinal axis of the housing 107. The end walls of the housing 107 are connected to the main body of the housing 107 by means of bolts 111. The pistons 109 and 110 divide the interior of the housing 107 into three compartments 112, 113 and 114 and the compartment 112 communicates through a pipe 112A and a backing valve 112B with a pump 115 and the compartment 113 communicates through a pipe 113A with a tank 116. The compartment 114 houses a compression spring 117 and communicates through a tapping 118 with a pipe 119 which leads to the hydraulic rams 50. The pipe 119 also communicates with the housing 107 and, as in the preceding embodiment, communicates through a pipe 119A with a pressure gauge 120.

The compression spring 117 is arranged at one end around a boss 121 provided on the piston 110 and at the other end bears against a stop 122. The stop 122 is formed with a tapped hole that receives a screw-threaded rod 123 which is taken through a hole formed in an end wall of the housing 107. The rod 123 is prevented from axial movement relative to the housing 107 by means of an adjusting wheel 124 provided on the outer projecting end of the rod 123 and a ring 123A mounted inside the housing 107 and abutting against an end wall thereof. The stop 122 is prevented from turning by a guide 125 provided inside the housing 107. The compression in the spring 117 can be varied by turning the wheel 124.

As in the control mechanisms 53 and 79 of the preceding embodiment, the adjusting member for displacing the pistons 109 and 110 includes a rod 126 projecting into the housing 107 and formed with a screwthread. The threaded rod 126 is received in a tapped hole formed in a boss 127 projecting from an end wall of the housing 107. The portion of the rod 126 that projects outwardly beyond the housing 107 is coupled with a spring-loaded control lever 128 which can occupy two different positions (see FIGURE 10).

In either of said two positions of the lever 128, a stop 129 carried by the lever 128 engages with either of two stops 130 provided on the housing 127. The spring loading of the lever 128 is afforded by a tension spring 131 which is arranged between a pin 132 carried by the lever 128 and a pin 133 provided on the housing 107. Turning of the lever 128 in one direction causes the rod 126 to be axially displaced towards the piston 109 and urges same so as to uncover the opening to the pipe 119 which allows high pressure liquid to flow from the pump 115 through the pipe 112A and compartment 112 to the hydraulic rams 50 thereby raising the mowing table. When the mowing table is raised on operation of the control lever 128, it will continue to hold its raised position for as long as the piston 109 is held out of engagement with the opening to the pipe 119 by the rod 126. Turning of the lever 128 in the opposite direction withdraws the rod 126 and the hydraulic pressure in the rams 50 caused by their support of the mowing table off the ground is exerted in the compartment 114 against the face of the piston 110 which then moves so that the pipes 119 and 113A can communicate with each other by way of the compartment 113 and hence liquid flows from the rams 50 to the tank 116 thus lowering the mowing table. The oscillations performed by the mowing table in following the surface of the ground during operation of the combine harvester are transmitted from the rams 50 to the control mechanism 106 which compensates for these undulations in similar manner to that of the preceding embodiment.

Referring to FIGURES 11 and 12, there is shown part of a tractor, the rear part thereof being shown in FIGURE 11 and part of FIGURE 11 being shown in FIGURE 12. The tractor is provided with a three-point hitch, whose lower links 134 are each coupled through a corresponding bar 135 with an angle lever 136. The other end of the angle lever 136 cooperates with a rod 137 which is coupled with a piston 138 reciprocable in an adjusting cylinder 139 which forms part of the hydraulic circuit of the tractor. The cylinder 139 is associated with a control mechanism 140 whose construction and operation is substantially similar to that of the control mechanisms 53 and 79 described with reference to FIGURES 3 to 6. Corresponding parts are designated by the same reference numerals.

The housing 141 of the control mechanism 140 is integral with the cylinder 139, the cylinder 139 communicating with the compartment 58 through a duct 142 and with the compartment 59 or 60 through a duct 143. The compartment 60 communicates with a hydraulic pump through a pipe 143A and the compartment 59 communicates with the hydraulic tank through a pipe 143B. The control mechanism 140 includes a rod 114 that is associated with the adjusting member for the pistons 55 and 56. The rod 144 is movable between three positions by means of a lever 145 which is displaceable along a guide 145B and can be inserted in any one of three recesses 145A formed in the guide 145B. In the position of the lever 145 shown in FIGURE 12 a constant pressure is maintained in the cylinder 139. It will be evident that working members can be coupled with the three-point hitch of the tractor. When the pressure in the cylinder 139 is relatively constant it will be evident that said working members will bear on the ground surface with a relatively constant pressure also. When the lever 145 is turned in a counterclockwise direction as seen in FIGURE 12 and inserted in the second recess 145A, the piston 55 is prevented from being displaced to the right as seen in FIGURE 12 which prevents the working members from being lowered since the pipe 143B leading to the tank and the duct 143 leading to the cylinder 139 cannot communicate with each other. Further turning of the lever 145 urges the piston 55 to the left as seen in FIGURE 12 and the pump can then communicate with the cylinder 139 thus causing the working members to be raised. When the lever 145 is in the position shown in FIGURE 12 and when working members are being drawn behind the tractor, oscillations performed by the working members in following the surface of the ground are transmitted to the cylinder 139 which will cause corresponding variations in pressure in the compartment 58 which in turn will cause the piston 56 to move within the housing 141. Such movement of the piston 56 and associated movement of the piston 55 will allow liquid to flow to or from the cylinder 139 from or to the pump or tank respectively. In this way the working members can smoothly follow the surface of the ground during operation. A pressure gauge 147 is connected to the adjusting cylinder 139 by way of a pipe 146 and may be observed in order to determine the pressure in the cylinder 139. It will be evident that this pressure in the cylinder 139 will control the pressure with which the working members bear upon the ground surface. A set bolt 70 is provided for controlling the compression in the spring disposed in the compartment 58 and it will be evident that the normal pressure with which the working members bear on the ground will be dependent on the compression in the spring.

In the machines described, that is, the three embodiments of the combine harvester and the tractor, their working members are enabled to bear upon the ground surface with any chosen given pressure and to follow the surface of the ground during operation. Also the provision of the pressure gauges enables the pressure in the hydraulic circuits to be readily determined and any adjustments may be made as a consequence of such observation.

Having thus described my invention, what I claim as new and desire to secure by Letters Patent of the United States is:

1. An agricultural implement having a frame, a crop-working member connected to said frame and bearing on the ground during operation, hydraulic ram supporting members for said crop-working member and a hydraulic circuit communicating with said supporting members for actuating said crop-working member, an adjustable control mechanism in said circuit responsive to variations in pressure caused by the contact of said crop-working member with ground undulations, means in said circuit allowing fluid to flow to and from said supporting members to compensate for said variations and maintaining a substantially constant hydraulic pressure in said circuit and said supporting members, said crop-working member being divided in at least two portions which are each coupled to further hydraulic ram supporting members by further hydraulic circuits for pivoting said portions relative to each other, further adjustable control mechanisms provided in said further circuits for allowing fluid to flow to and from said rams to compensate for variations in hydraulic pressure caused by the contact of said portions with ground undulations, gauge means communicating with fluid of at least one of said hydraulic circuits for indicating to the operator of the implement the pressure with which said crop-working member bears on the ground, said gauge means being visible from the vicinity of said control mechanisms whereby said operator can selectively reduce or increase the downward pressure of said working member on the ground by adjusting said control mechanisms.

2. An implement in accordance with claim 1, comprising a harvesting machine, said crop-working member including a mowing table.

3. An implement in accordance with claim 1, wherein said gauge means communicates with the said supporting members through a pipe.

4. An implement in accordance with claim 1, wherein the said control mechanisms include first and second interconnected pistons reciprocable in a housing, said second piston being spring biased, and being subjected to the pressure prevailing in said circuit and slidable in the same direction as said biasing.

5. An implement in accordance with claim 4, wherein said pistons are spaced from each other by a given distance, and said first piston defines two compartments within said housing which communicate respectively with a pump and a tank.

6. An implement in accordance with claim 4, wherein said spring biasing is arranged in a compartment of the housing which communicates with a pipe leading to said supporting member, and wherein means are provided for varying the force exerted by said spring biasing, the control mechanism including an adjusting member for urging said piston against said spring biasing whereby the compartment communicating with said pump also communicates with said hydraulic supporting member, and said adjusting member includes a rod displaceable in a plane to the longitudinal axis of said housing.

7. An implement in accordance with claim 6, wherein said rod is displaceable between three positions, the rod being out of contact with said first piston in a first of three positions, and just abutting against said first piston in a second of said three positions for preventing movement of said first piston in one direction, the free end of said rod being urged into contact with the periphery of a turnable cam disc by a spring and a retaining member provided for locking said disc in different positions.

8. An implement in accordance with claim 6, wherein said rod is displaceable by being turned about its own axis, the end of said rod being coupled with a spring-loaded arm which is movable between a plurality of positions for adjusting said rod.

9. In an agricultural implement having a frame and a crop-working member which is divided into at least two portions which are independently pivotable about a substantially horizontal axis, means for controlling the height of said crop-working member relative to the frame including a pressure-operated fluid device between the frame and the crop-working member for carrying part of the total weight of the crop-working implement by the frame, a source of fluid operatively associated with said pressure-operated fluid device, each of said portions of said crop-working member having ground engaging means for carrying part of the total weight of the portion, said pressure-operated fluid device including a pair of hydraulic ram supporting means for providing support for each of said portions and conduit means interconnecting said hydraulic ram means whereby fluid pressures in said ram means are equalized, and fluid-operated control means in fluid communication with said device and responsive to changes in pressure in said ram means to discharge fluid from the device when the pressure in said ram means exceeds a predetermined value corresponding to more than a predetermined weight of said crop-working member on said frame and to connect the said source of pressure fluid to said ram means when fluid pressure therein falls below a predetermined level, whereby a substantially constant predetermined part of the weight of said crop-working member is carried by said frame and a predetermined part of the weight of each of said portions is carried by its respective ram means.

10. In an implement as claimed in claim 9, gauge means visible to the operator of the implement responsive to the fluid pressure in said ram means.

11. An agricultural implement in accordance with claim 9, wherein the axis about which said portions of said crop-working member are independently pivotable is transverse to the operative direction of travel of the implement.

References Cited

UNITED STATES PATENTS

| | | | |
|---|---|---|---|
| 2,913,878 | 11/1959 | Rue | 56—20 X |
| 3,019,029 | 1/1962 | Sampietro | 267—64 X |
| 3,088,264 | 5/1963 | Sallee | 56—210 |
| 3,312,048 | 4/1967 | Annat et al. | 56—214 |
| 3,386,235 | 6/1968 | Van der Lely | 56—210 |

FOREIGN PATENTS

| | | |
|---|---|---|
| 1,225,520 | 2/1960 | France. |

ANTONIO F. GUIDA, Primary Examiner

PASQUALE A. RAZZANO, Assistant Examiner